Jan. 3, 1928.
G. D. ANGLE
1,654,773
ARTICULATED CONNECTING ROD
Filed Feb. 23, 1926
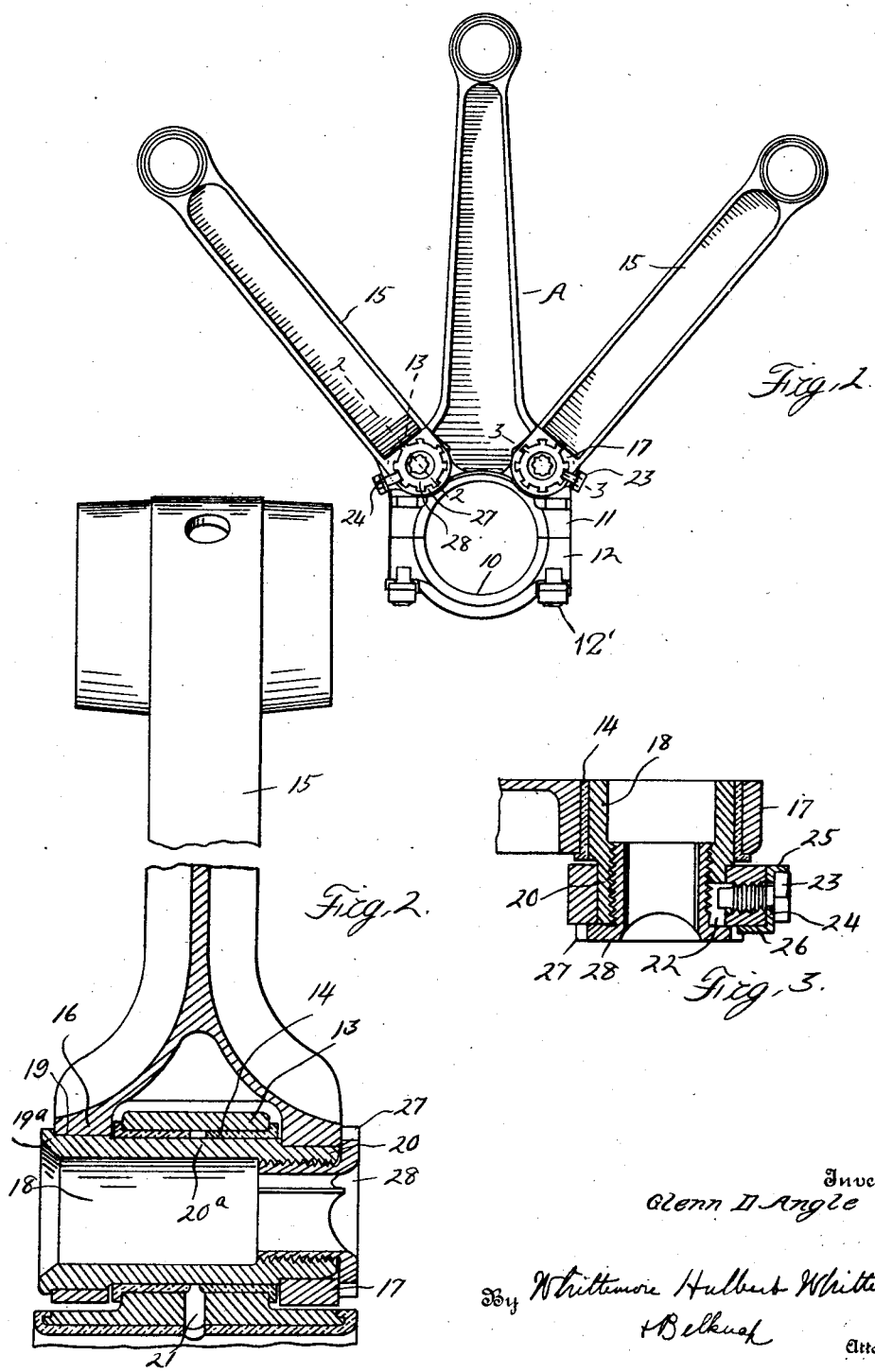

Patented Jan. 3, 1928.

1,654,773

UNITED STATES PATENT OFFICE.

GLENN D. ANGLE, OF DETROIT, MICHIGAN.

ARTICULATED CONNECTING ROD.

Application filed February 23, 1926. Serial No. 90,146.

The invention relates to engines and refers more particularly to a connecting rod construction of the articulated type, such as are used in V, W, or radial type engines.

The articulated type of connecting rod is frequently employed in engines in which more than one cylinder operates about a single crank-pin. It consists of a master rod having a full bearing upon the crank-pin to which are hinged the required number of link connecting rods for the other cylinders located in that plane of rotation. The path of the lower or crank-pin ends of the link rods is of no simple geometric shape, due to the fact that these oscillate upon pins connecting them to the master rod. The disadvantages accruing from this motion, which naturally causes these pistons to travel differently from the one attached to the master rod, is more than compensated for by the excellent conditions provided for a bearing on the crank-pin. This latter becomes particularly noticeable in engines of relatively large piston displacement; that is, when compared to the other constructions known as the forked (or straddle) type and the slipper type rods.

The construction forming the subject matter of this invention has to do with attaching or hinging the link rod to the master. One type of construction often employed is to fork the master rod, supporting and locking the pin in the forked ends and having the eye or boss of the link rod bear upon the pin between the forked ends. This construction usually involves an expensive and none too mechanically satisfactory method of locking, besides involving an excessive amount of machine work on the master rod in producing the fork.

Another type of construction which is generally considered a more practical and less expensive one, is to fork the ends of the link rods and support and lock the pin in the eye or boss provided on the master rod. There are two disadvantages commonly experienced in prior constructions of this type which are eliminated by my invention. These disadvantages are as follows: First, the forks on the link rods can rarely be made light and yet sufficiently rigid to prevent serious deflection under heavy loads; second, the pin must be assembled without scoring the surfaces and since it must be a tight fit in the boss on the master rod, it follows that the latter must be split and clamped after the pin is in place. Naturally it is rather difficult to maintain a round hole for fully supporting the pin in the split boss of the master rod during all of the manufacturing processes.

My invention so holds the forked ends of the link rod that it cannot deflect under load and it does not require a saw slot in the boss on the master rod that supports the pin. In assembling my construction there is also no possibility of scoring the bearing surfaces of the pin.

With these and other objects in view, the invention resides in the novel features of construction and combination and arrangements of parts as more fully hereinafter described and claimed.

Referring to the drawings in which like reference characters indicate corresponding parts:

Figure 1 is an end elevation view of the master rod with the connecting rod links secured thereto in accordance with my invention;

Figure 2 is a detail view partly in section along line 2—2 of Figure 1; and

Figure 3 is a detail sectional view along line 3—3 of Figure 1.

In the drawings reference character A represents the master rod having a bearing 10 upon the usual crank-pin (not shown). The master rod may comprise upper and lower sections 11 and 12 respectively clamped together by bolts 12' in accordance with customary design. One of these sections may be formed with bosses 13, bored to receive the bushings 14 which may have outwardly flanged ends as shown in Figure 2. 15 represents the link connecting rods forked at their lower ends to provide spaced bearings 16 and 17 for the pin 18. The latter pin is stepped in diameter as at 19, 20 and 20ᵃ and locked in one of the forks of the link rod as hereinafter described. The stepped portions 19 and 20 engage in the forks 16 and 17 respectively while the intermediate portion 20ᵃ forms a journal free to oscillate in the boss 13. Endwise deflection cannot occur because the forked ends of the link rod are held against the shoulders formed by the ends of bushing 14. The pins 18 consequently oscillate with the end of each link rod and bear in the eyes, or bores of the master rod, which are provided with suitable bushings 14. In assembly there is no possibility of scoring the bearing surfaces of the pin since the steps are of such diameters as to provide plenty of clearance. Lubricating oil can be fed to the bearing of the pin directly from the crank-pin bearing through passage 21 without first having to circulate it through the pin with closed ends as in the case where the pin is fixed in the master rod, either in the fork or eye, as the case may be.

Any desired means of locking the pin in the link rod may be employed; however, that shown is preferred because so few parts are required with no unnecessary projections. To this end a slot 22 is provided in the small end 20 of the pin 18 to receive the end of a set screw 23 threaded into a tapped hole on one side of the fork of the link rod 15. A convenient means for locking the set screw is by a soft iron washer 24 having an extension 25 turned up against one of the sides on the head of the screw 23 and also having another extension 26 which is adapted to be turned down into one of the peripheral slots 27 in the nut 28. This nut is threaded in the end 20 of pin 18 and is flanged outwardly to hold the pin 18 endwise in the link rod. If desired, the other end of pin 18 may be expanded as at 19ª to further assist in preventing endwise movement of the pin.

While it is believed that from the foregoing description, the nature and advantage of my invention will be readily understood, I desire to have it understood that I do not limit myself to what is herein shown and described and that such changes may be resorted to when desired as fall within the scope of the claims.

What I claim as my invention is:—

1. An articulated connecting rod assembly comprising a master rod having a main crank-pin bearing, said master rod being formed with a boss, a link connecting rod having an end forked to receive said boss, a pin forming a connection between the boss and the forked end of the link rod, said pin being stepped to provide three portions thereof of different diameters, two of said stepped portions being engaged respectively in the said forked ends of the link rod and the third step portion forming a journal in the said boss, and means securing the pin to the link rod to prevent endwise and rotational movement of the pin with respect to the link rod including a member threadedly engaging the small end of said pin.

2. An articulated connecting rod assembly comprising a master rod having a main crank pin bearing, said master rod being formed with a boss, a link connecting rod having an end forked to receive said boss, a pin forming a connection between the boss and the forked end of the link rod, and means for preventing relative rotational movement of the pin with respect to the link rod including a headed element threadedly engaging the link rod and having a portion thereof projecting into a slot formed in one end of the pin.

3. An articulated connecting rod assembly comprising a master rod having a main crank pin bearing, said master rod being formed with a boss, a link connecting rod having an end forked to receive said boss, a pin forming a connection between the boss and forked end of the link rod, said pin being stepped to provide end portions thereof of different diameters engageable respectively in said forked ends of the rod, and means for holding the pin end-wise in the link rod including a member threadedly engaging said pin and having a portion engaging the forked end of said rod.

4. An articulated connecting rod assembly comprising a master rod having a main crank pin bearing, said master rod being formed with a boss, a link connecting rod having an end forked to receive said boss, a pin forming a connection between the boss and the forked end of the link rod, said pin being stepped to provide end portions thereof of different diameters engageable respectively in the said forked ends of the link rod, the intermediate portion of said pin forming a journal in said boss, and means for locking the pin in the link rod, including a headed element extending through a portion of said forked end and projecting into said pin.

5. An articulated connecting rod assembly comprising a master connecting rod, having a main crank pin bearing, said master rod being formed with a boss, a link connecting rod, a pin forming a connection between the boss and link rod, said pin being stepped in diameter to provide bearings of different diameter between the boss and link rod, means for securing the pin to the link rod to prevent end-wise movement thereof including a member threadedly engaging said pin having a peripheral flange provided with a plurality of peripherally arranged slots, and a member carried by said forked end engageable in the slots aforesaid for preventing rotative movement of the pin with respect to the link rod.

In testimony whereof I affix my signature.

GLENN D. ANGLE.